(12) United States Patent
Lampe-Juergens et al.

(10) Patent No.: US 11,402,247 B2
(45) Date of Patent: Aug. 2, 2022

(54) GAS METER SYSTEM AND METHOD FOR DIAGNOSING GRID PRESSURE FROM PRESSURE REGULATOR

(71) Applicant: Honeywell International Inc., Morris Plains, NJ (US)

(72) Inventors: Christian Lampe-Juergens, Spelle (DE); Tobias Meimberg, Osnabrueck (DE); Ralf Schroeder genannt Berghegger, Glandorf (DE); Andreas Wuchrer, Georgsmarienhuette (DE); Norbert Flerlage, Loeningen (DE)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 109 days.

(21) Appl. No.: 16/949,517

(22) Filed: Nov. 2, 2020

(65) Prior Publication Data
US 2022/0136875 A1 May 5, 2022

(51) Int. Cl.
*G01F 1/34* (2006.01)
*G01F 15/00* (2006.01)
*G01F 15/18* (2006.01)
*G01F 15/063* (2022.01)

(52) U.S. Cl.
CPC ............ *G01F 1/34* (2013.01); *G01F 15/005* (2013.01); *G01F 15/063* (2013.01); *G01F 15/185* (2013.01)

(58) Field of Classification Search
None
See application file for complete search history.

(56) References Cited

U.S. PATENT DOCUMENTS

| | | | |
|---|---|---|---|
| 5,554,976 A | 9/1996 | Miyauchi et al. |
| 5,677,480 A | 10/1997 | Liyanage et al. |
| 6,035,878 A | 3/2000 | Adams et al. |
| 6,441,744 B1 | 8/2002 | Adams et al. |

OTHER PUBLICATIONS

Leo, et al., "Simulation and health monitoring of a pressure regulating station", Computers and Chemical Engineering, vol. 139, pp. 1-13 (2020).

*Primary Examiner* — Harshad R Patel
(74) *Attorney, Agent, or Firm* — John Maldjian; Stevens & Lee PC

(57) ABSTRACT

Embodiments relate to a system including a gas meter, regulator, and head end system. The system can include installing a regulator in a gas supply grid. The system may also include installing a gas meter in a gas supply grid, wherein the gas meter is installed to diagnose a grid pressure over flow rate of the regulator. In addition, the system may include determining, by the gas meter, an initial fingerprint of the regulator, wherein the initial fingerprint indicates an initial pressure and flow rate profile over a time period after the gas meter was installed. Further, the system can include comparing, by the gas meter, continuous pressure readings of the regulator with the initial fingerprint, wherein the gas meter determines if the continuous pressure readings correspond to the initial fingerprint. The system may also include notifying, by the gas meter, a head end system of the continuous pressure readings.

20 Claims, 3 Drawing Sheets

GAS METER SYSTEM AND METHOD FOR DIAGNOSING GRID PRESSURE FROM PRESSURE REGULATOR

TECHNICAL FIELD

The present disclosure generally relates to a gas meter and regulator in a system. More specifically, the present invention provides a system for a gas meter determining the health and functioning of a regulator.

BACKGROUND

Currently, meter operators do not have information if a regulator within the same system as the meter operator is functioning properly. Meter operators also do not have information as to whether a regulator is going to break in the near future. There is no current way to monitor regulators to determine that they are functioning properly, or that determine at an approximate time when the regulator will not function properly.

Another drawback is that if regulators are finally broken, then downstream installation will get pressure that is too high, or no pressure at all. In addition, downstream installation is not work further as well or is at risk to be damaged by a too high pressure.

In addition, another problem is that regulators typically do not have one or more pressure sensors. Regulators also do not have any communication modules that it can use to alert a head end system that it needs assistance. As such, when the regulator is broken or soon to be damaged, it has no means of alerting a head end system of its situation. Further, there is no way to track the current functioning of the regulator to ensure that the pressure measurements of the regulator show that the regulator is operating correctly.

Accordingly, there is a need for gas meters that can monitor the pressure readings of the regulator. A gas meter that has one or more pressure sensors that can measure the pressure readings of the regulator to determine whether or not the regulator is operating correctly. In addition, there is a need for gas meters to have pressure sensors and or communication modules that can alert a head end system when a regulator is broken or damaged, and in need of assistance.

Therefore, it is imperative to have gas meters in a system with regulators that have the functioning capabilities of monitoring the pressure readings of a regulator. In addition, it is also imperative for the gas meters to be able to communicate to the head end system when the regulators are not working and are in need of assistance.

SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments is to provide an improved determination of regulator health in the systems and method thereof.

It is another aspect of the disclosed embodiments to provide for a smart meter to be configured to track regulatory health of a regulator in a system.

It is another aspect of the disclosed embodiments to provide a method and system of alerting a head end system of damage or potential damage to a regulator.

The aforementioned aspects and other objectives can now be achieved as described herein. In an embodiment, a method of installing a regulator in a gas supply net occurs. The method can also include installing a gas meter in the gas supply net. The gas meter will be used to count gas volume for billing purpose, but additionally it can be used to monitor pressure regulator health. The method also includes the gas meter identifying an initial fingerprint of the regulator. The initial fingerprint indicates an initial pressure and flow rate over a time period after the gas meter was first installed. Seasonal adaptions could be made or calculated to the initial fingerprint as gas consumption will change between summer and winter season. The method also includes the gas meter comparing continuous pressure readings of the regulator with the initial fingerprint. The gas meter determines if one or more of the continuous pressure readings correspond to the initial fingerprint. The gas meter can notify a head end system of the one or more continuous pressure readings.

In an embodiment of the method, the gas meter notifies the head end system when the one or more continuous pressure readings do not correspond to the initial fingerprint.

In an embodiment of the method, a pressure sensor can be configured within the gas meter to take an initial pressure and a related flow rate measurement of the regulator after the gas meter is first installed.

In an embodiment of the method, a pressure reading can be configured in a meter index to communicate to the head end system.

In an embodiment of the method, the grid pressure is determined by calculating a pressure difference between a pressure sensor in the gas meter and another pressure sensor in an electronic index.

In an embodiment of the method, the initial fingerprint is an initial pressure pattern in relation to flow rates of the regulator.

In an embodiment of the method, the gas meter can send an alarm to the head end system in response to one or more of the continuous pressure readings not corresponding to the initial fingerprint.

In another embodiment, a system can include a regulator installed in a gas supply net. A gas meter can also be supplied in the gas supply net. The gas meter can be configured to take continuous pressure readings of the regulator during lifetime to determine if the regulator is functioning properly. The system can also include a head end configured to receive an alarm from the gas meter. The gas meter can send an alarm to the head end to indicate the regulator is not functioning properly.

In an embodiment of the system, the gas meter can take the initial fingerprint over an initial period of time after the gas meter is first installed.

In an embodiment of the system, a first pressure sensor can be configured within a housing of the gas meter, and a second pressure sensor can be configured within a meter index.

In an embodiment of the system, the gas meter can be configured to track how the regulator behaves when one or more downstream devices are closed.

In an embodiment of the system, the gas meter can determine if the continuous pressure and flow rate readings are within a range of the initial fingerprint.

In an embodiment of the system, the gas meter can be configured to determine if an integrated valve needs to be closed when the continuous pressure and flow rate readings do not match the initial fingerprint.

In another embodiment of the system, a regulator can be configured upstream in a grid. The system can also include a gas meter can be configured in the grid. The gas meter can be configured to take an initial pressure measurement of the regulator. The system may also include a pressure sensor configured within the gas meter to enable the gas meter to measure a closing pressure of the regulator. The closing pressure of the regulator is used to identify an initial fingerprint of the regulator. The system can also include a head end configured to be informed by the gas meter whether later pressure measurements of the regulator do not correspond with the initial fingerprint of the regulator.

BRIEF DESCRIPTION OF THE FIGURES

The accompanying figures, in which like reference numerals refer to identical or functionally-similar elements throughout the separate views and which are incorporated and form a part of the specification, further illustrate the present invention and, together with the detailed description of the invention, serve to explain the principles of the present invention.

Figure 1:
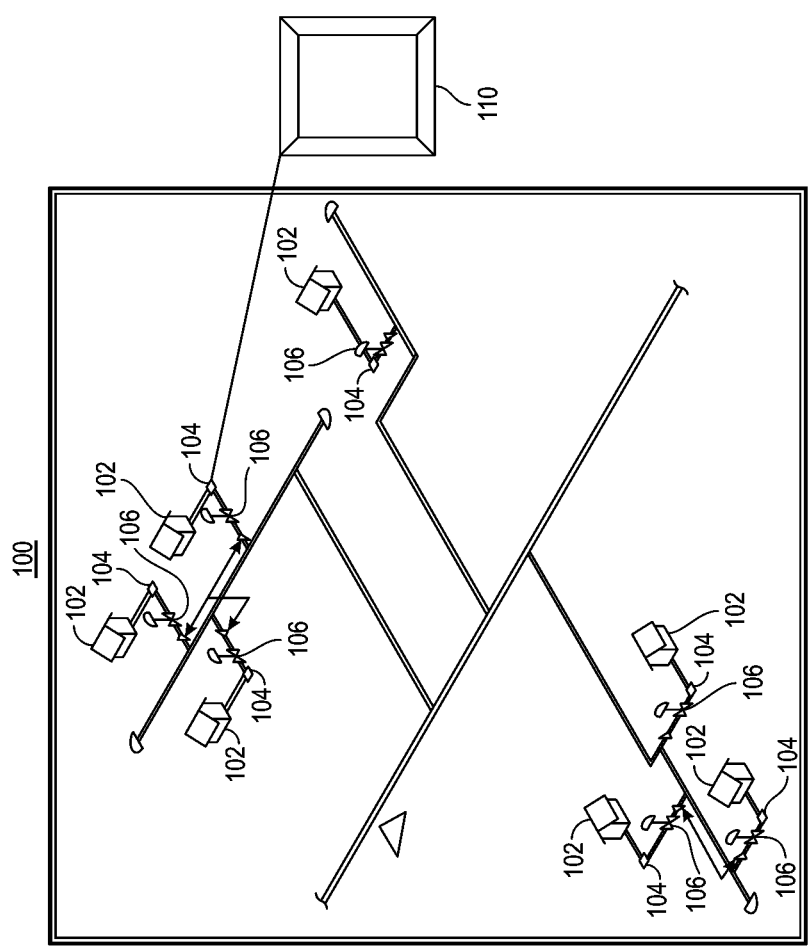
FIG. 1 illustrates a diagram of a system, which can be implemented in accordance with an embodiment.

Unless otherwise indicated illustrations in the figures are not necessarily drawn to scale.

DETAILED DESCRIPTION OF SOME EMBODIMENTS

Background and Context

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different form and, therefore, covered or claimed subject matter is intended to be construed as not being limited to any example embodiments set forth herein, example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The followed detailed description is therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as a "a," "an," or "the: again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One having ordinary sill in the relevant art will readily recognize that the subject matter disclosed herein can be practiced without one or more of the specific details or with other methods. In other instances, well-known structures or operations are not shown in detail to avoid obscuring certain aspects This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although claims have been included in this application to specific enumerated combinations of features, it should be understood that the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., *Mars Inc.* v. *H.J. Heinz Co.*, 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation . . . ".

A description of an embodiment having components in communication with each other does not infer that all enumerated components are needed.

A commercial implementation in accordance with the scope and spirit of the present disclosure may be configured according to the needs of the particular application, whereby any function(s) of the teachings related to any described embodiment of the present invention may be suitably changed by those skilled in the art.

The example embodiments described herein can be implemented in a system to enable a gas meter to monitor and track the health of a regulator in the system by continuously checking the pressure readings of the regulator in relation to a flow rate.

Aspects of the present invention are described below with reference to flowchart illustrations and/or block diagrams of methods, and systems according to the disclosed embodiments. Each block of the flowchart illustration and/or block diagrams, and combinations of blocks in the flowchart illustrations and/or block diagrams, can be implemented by various means.

The flowchart and block diagrams in the figures illustrate the architecture, functionality, and operation of possible implementations of systems and methods according to various embodiments. In this regard, each block in the flowchart or block diagrams may represent a segment which comprises one or more executable instructions for implementing the specified function(s). Functions noted in the block may occur out of the order noted in the figures. For example, two blocks shown in succession may, in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices that are not explicitly described as having such functionality/features. Also, various embodiments of the present invention need not include a device itself.

Where the gas meter and regulator are described, it will be understood by those of ordinary skill in the art that gas meters and regulators alternative to those described may be implemented. Any schematic illustrations of the gas meter and the regulators and accompanying descriptions of any sample gas meters and regulators presented herein are example arrangements for stored representations of information. Embodiments of the invention may also be implemented in one or a combination of systems.

More specifically, as will be appreciated by one skilled in the art, aspects of the present invention may be embodied as a system and/or method. Furthermore, aspects of the present invention may take the form of a plurality of systems to enable gas meter to diagnose the health of regulators within the system.

Additionally, any uses of the phrase "configured to" or "operable for" can include generic structure that is manipulated to operate in a manner that is capable of performing the task(s) at issue. "Configured to" may also include adapting a manufacturing process to fabricate cylinder devices that are adapted to perform one or more tasks.

Introduction

The present invention includes a system with houses, regulators and gas meters. The initialization can be triggered by the installer of the gas meter or by the head end system at any time. Important for starting the initialization is that the regulator, gas meter, and down stream installation is installed and used. When it is first installed, the gas meter can take an initial pressure of the regulator after an initialization period for the gas meter. The initial time period in which the gas meter determines the initial fingerprint depends on how long it takes to get sufficient pressure readings for several flow rates (from a min to a max. flow rate). No set time frame is set for the initialization period. The gas meter is configured to take an initial pressure measurement of the regulator in relation to a flow rate measurement. A pressure sensor can be configured within the gas meter to take the initial pressure measurement of the regulator. The gas meter stores this initial pressure measurement and the related flow rate measurement as one part of an initial fingerprint of the regulator.

After the gas meter has taken an initial fingerprint of the regulator (this requires several pressure readings at different flow rates), the gas meter can periodically and continuously determine if the regulator is functioning properly. The gas meter determines if the regulator is functioning properly by taking continuous pressure readings of the regulator. The gas meter makes note of the continuous pressure and flow rate readings and determines if the one or more continuous pressure readings correspond to the initial fingerprint. The gas meter determines if the one or more continuous pressure readings match or are within the range of the initial fingerprint. If one or more of the continuous pressure readings do not match or are out of range of the initial fingerprint, the gas meter can determine that the regulator is damaged or about to be damaged, and also not functioning properly.

When the gas meter determines that the regulator is either broken or about to be damaged, the gas meter can send an alarm to a head end system. A communication module (RF) within the meter index can send an alarm to the head end system. In addition, the gas meter can decide to shut off an integrated valve. Overall, the gas meter can continuously monitor the regulator with continuous pressure readings and alert the head end system when one or more of the continuous pressure readings do not align with the initial fingerprint.

System Structure

FIG. 1 illustrates a block diagram of a system 100, which can be implemented in accordance with an embodiment. The system 100 can include one or more housings 102. Near each housing 102, a gas meter 104 can be installed. Further, near each gas meter 104, and upstream from each gas meter 104, a regulator 106 can be installed. Each gas meter 104 within the system 104 can monitor the pressure pattern of the nearby regulator 106 within the system 100.

In FIG. 1, a pressure pattern learning process will begin. When the system 100 is fully functional, when gas supply is present, the regulator 106 installed, the gas meter 104 is installed, and the downstream installation is installed. For the initial fingerprint, several pressure readings at different flow rates are required. The learning is completed when enough readings are taken to store the profile of the pressure in the regulator 106. During this initial period, the gas meter 104 will track how the regulator 106 located upstream from the gas meter 104 behaves. Moreover, the gas meter 104 will track how pressure of the regulator 106 behaves in case of different flows. In addition, the gas meter 104 will also track how the regulator 106 behaves when downstream devices in the system 100 are closed. The gas meter 104 will ultimately measure a closing pressure of the regulator 106. The closing pressure of the regulator 106 is one good indicator of the initial pressure pattern of the regulator 106. The gas meter 104 will then store the initial pressure and flow rate pattern of the regulator 106. The initial pressure pattern can be the initial fingerprint of that regulator 106.

In FIG. 1, after the gas meter 104 has stored the initial fingerprint of the regulator 106, the gas meter 104 can continue to take pressure readings of the regulator 106 to ensure that the regulator is functioning correctly. The period of time in which the gas meter 104 takes the continuous pressure readings can vary. The initial time period in which the gas meter identifies the initial fingerprint depends on how long it takes to get sufficient pressure readings for several flow rates (from a min to a max. flow rate). The gas meter 104 is attempting to ensure that the continuous pressure readings of the regulator 106 are within the range of the initial fingerprint and/or match the initial fingerprint. The gas meter 104 is tracking the regulator 106 to ensure that the regulator 106 is functioning properly. In an instance where one or more of the continuous pressure readings do not match or fall within the range of the initial fingerprint, the gas meter 104 can send an alarm to a head end system (head end) 110 within the system 100. The regulator 106 does not have one or more pressure sensors configured within the regulator 106. The regulator 106 also does not have a communication module to communicate to the head end 110 when it starts to get damaged or is broken. Accordingly, the gas meter 104 can notify the head end 110 as opposed to the regulator 106 if the regulator 106 is not functioning properly. Once the head end 110 receives the alarm from the gas meter 104, the head end 110 can send for assistance in order to remedy the situation. The gas meter 104 can also shut off an integrated valve in response to the regulator 106 being broken or possibly damaged.

In FIG. 1, as the gas meter 104 is tracking the regulator 106 and performing continuous pressure measurements of the regulator 106, the gas meter 104 can determine that the regulator 106 may be broken or start to be damaged by one or more of the continuous pressure readings. A pressure sensor within the gas meter 104 can enable the gas meter 104 to perform the continuous pressure readings of the regulator 106 and determine if the regulator is functioning properly. The gas meter 104 can identify whether the regulator 106 can be broken or when it is starting to get damaged. The gas meter 104 identifying when continuous pressure readings of the regulator 106 are not corresponding to its initial fingerprint store can enable the gas meter 104 to determine that the regulator 106 is either damaged or starting to be damaged. When the gas meter 104 determines that the regulator 106 is starting to be damaged or is damaged, it can inform the head end 110. A communication module in an electronic index (as will be described in FIG. 2) meter 104 can send an alarm to the head end 110.

Referring to FIG. 1, the gas meter 104 can have one or more pressure sensors configured within the housing and electronic index of the gas meter 104 (which will be described in FIG. 2). One of the pressure sensors can be configured within the housing of the gas meter 104, while the other pressure sensor can be configured within an electronic index (to be explained further in FIG. 2). The gas meter 104 can calculate the pressure difference between both pressure sensors to obtain the current grid pressure within the gas meter. The current grid pressure of the gas meter 104 can be typically in the low pressure grid around 20-30 mbar (0.3-0.45 PSI), When the gas meter 104 determines a change from flow to no flow, then an initial closing pressure of the regulator 106 can be taken, the pressure sensor inside of the gas meter 104 enables the gas meter 104 to determine the initial closing pressure of the regulator 106, and also enable an initial fingerprint of the regulator 106 to be identified. The gas meter 104 can perform continuous pressure measurements of the regulator 106 to ensure that the regulator 106 is functioning properly. As such, when one or more of the continuous pressure readings is outside of the range of the initial fingerprint, the gas meter 104 is capable of determining that the regulator is either damaged, or about to be damaged. In such an instance, the regulator exchange could be initiated prior to downstream installation. The gas meter 104 can effectively take care of the health of the regulator 106. The regulator 106 would not need to have any internal pressure sensors to alert the head end 110 that the regulator 106 needs to be either repaired or replaced. Accordingly, when the gas meter 104 determines that the regulator 106 is broken or about to be broken, the communication module in the electronic index (to be illustrated in FIG. 2) can send the alarm to the head end 100 that indicates that the regulator is broken or damaged.

In FIG. 1, once the head end 110 receives the alarm that the regulator 106 is broken, the head end 110 can send for help to repair the regulator 106. The head end 110 can enable the regulator 106 to obtain the repairs that the regulator 106 to once again function properly. In other words, the gas meter 104 would be able to obtain pressure readings of the regulator 106 that are the same or substantially similar to the stored initial fingerprint. In the alternative, the head end 110 can also provide assistance to enable the regulator 106 to be replaced and/or repaired.

To better understand the smart gas meter 104, it is important to note the assembly of the gas meter 104. The internal construction of the gas meter 104 can illustrate how the gas meter 104, once installed in the system 100, can take an initial pressure and flow rate reading of the regulator 106. In addition, it can also be understood how the gas meter 104 is able to alert the head end 110 once the regulator 106 is damaged or appears to be damaged.

Figure 2:
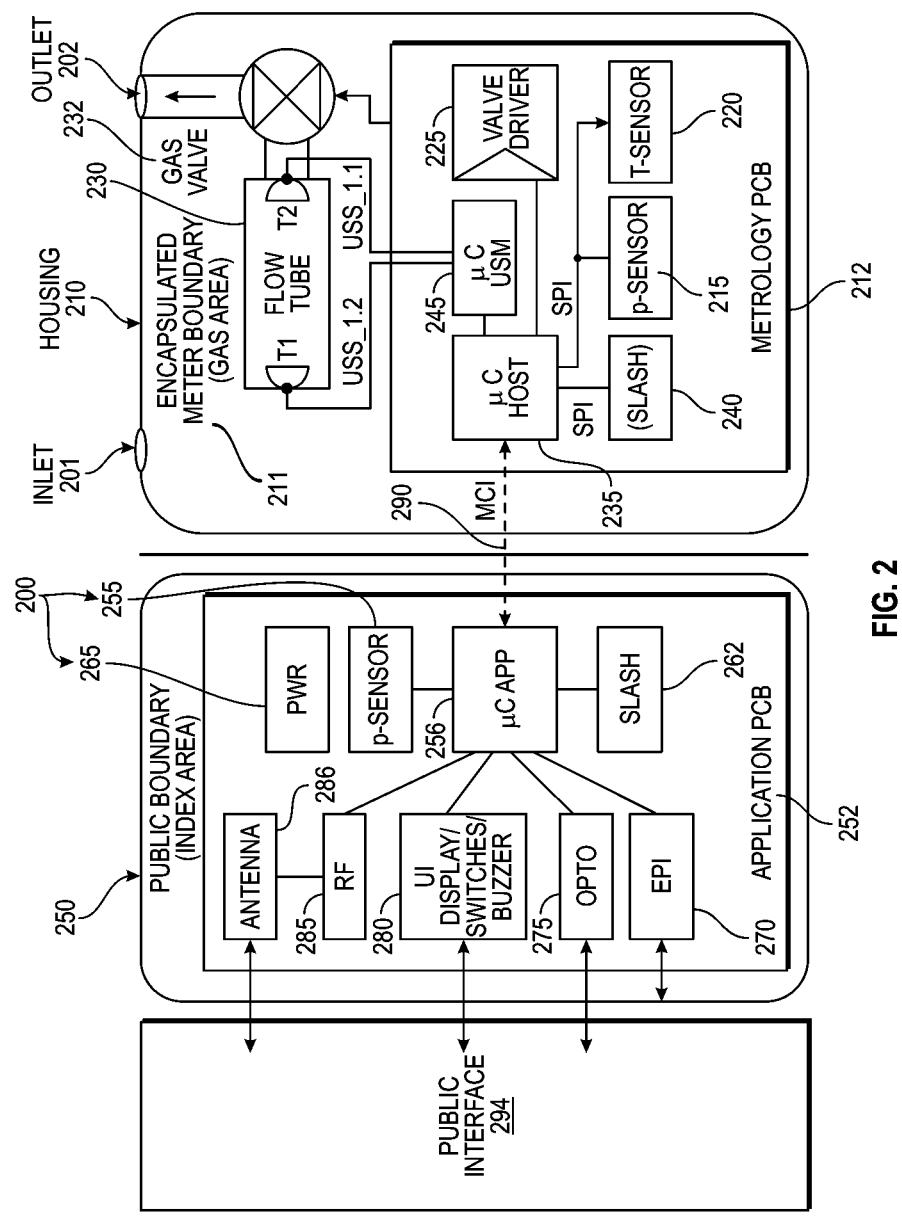
FIG. 2 illustrates a schematic diagram in accordance with an embodiment.

Referring to FIG. 2, a gas meter 200 that can be found in the system of FIG. 1 is illustrated. The gas meter 200 can include meter housing that includes a pressure sensor, temperature sensor, valve driver, and flow measurement. The gas meter can also include a meter index with a second pressure sensor. In addition, the meter index can include a communication module to communicate with the head end system. A metrology communication interface can be the interface between the meter index and the meter housing.

In FIG. 2, next to the pressure sensor 215, a temperature sensor 220 is situated. The temperature sensor 220 can measure the temperature inside of the gas meter 200. In addition, a valve driver 225 and an ultrasonic sensor tube 230 are illustrated. A μc can be used for calculation with the μC Host 235, slash 240 and the μC USM 245. In FIG. 2, the gas meter 200 can include a housing 210. The housing 210 can include an inlet 201, an outlet 202, and an encapsulated meter boundary 211. Within the meter boundary 211, there is a Metrology PCB Board (PCB Board) 212. Within the PCB board 212, there can include a pressure sensor 215. The pressure sensor 215 can be used to measure the absolute+ net pressure of the gas meter 200. Next to the pressure sensor 215 is a temperature sensor 220. In addition, a valve driver 225, a μC USM 245, and a μC HOST 235 are illustrated. The flow tube 230 can be used to measure the flow rate for the gas meter 200. A gas valve 232 is situated next to the flow tube 230.

In FIG. 2, an index area 250 is also illustrated. The index area 250 can include an application PCB board 252. Within the index area 250, a pressure sensor 255 is configured. The pressure sensor 255 in the index area 250 will be used to measure absolute ambient pressure. The pressure sensor 215 within the housing 210 will measure absolute+ grid pressure. The difference between both is used as grid pressure or the actual pressure of the regulator. When the gas meter 200 senses that the regulator is broken or about to be damaged, an RF/communication module 285 can alert the head end system of the status of the regulator. The RF 285 can send an alarm to the head end system to notify the head end system of the health of the regulator due to one or more of the continuous pressure readings not corresponding or being within the range of the initial fingerprint. Accordingly, the RF 285 can send an alarm to the head end system that alerts the head end system that the regulator is either broken or not functioning properly. The RF 285 can send this alma when the pressure reading of the regulator is out of the range of the initial fingerprint stored within the gas meter. Accordingly, when the gas meter 200 conducts the continuous pressure readings of the regulator, and determines that one or more of the continuous pressure readings do not correspond to the initial fingerprint, the RF 285 can send an alarm to the head end system indicating that the regulator is not functioning properly and may need repair.

In FIG. 2, the index area 250 also includes a slash 262, uc App 260, PWR 265, EPI 270, Opto 275, display switches 280, the RF 285, and antenna 286. A metrology communication interface (MCI) 290 is the interface between the metrology PCB board 212 in the gas meter 200 and the application PCB board in the index area 250. Further, the index area 250 is positioned in a public interface 294. The public interface 294 can enable access to the display/switches 280 and the RF 285.

In FIG. 2, a public boundary index area 250 is also illustrated. The index area 250 can include an application PCB board 252. Within the public boundary index area 250, a pressure sensor 255 is configured. With respect to FIG. 2, the pressure sensor 215 in the meter boundary 211 and the pressure sensor 255 in the index area 250 can be used to calculate the grid pressure of the regulator. The difference between the pressure sensor 215 and the pressure sensor 255 can obtain the grid pressure. Both pressure sensors 215, 255 can be involved in the determining of the initial fingerprint of the regulator in relation to a flow rate. In addition, the pressure sensor 215 of the meter boundary 210 can enable the gas meter 200 to determine the continuous pressure readings of the regulator. Further, the RF 285 of the index area 250 can send the alarm to the head end system to alert the head end system when the regulator is broken and/or not functioning properly.

Figure 3:
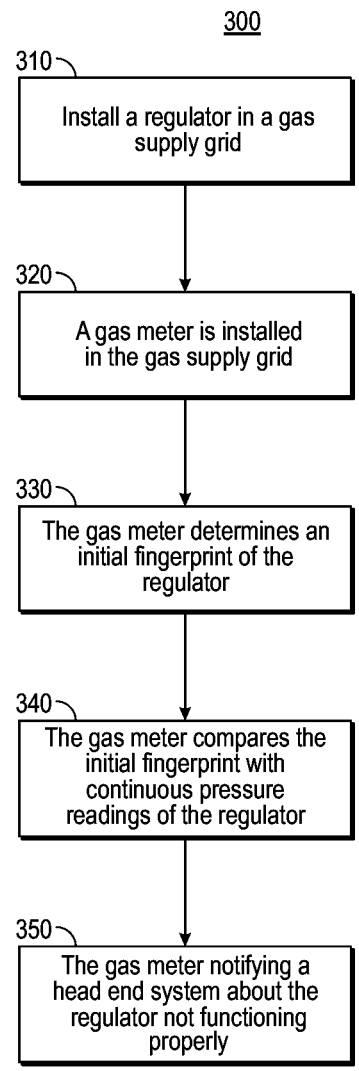
FIG. 3 illustrates a method of determining whether a regulator is functioning properly in accordance with an embodiment.

In FIG. 3, a method 300 of obtaining continuous pressure readings of a regulator by a gas meter is described. At step 310, a regulator is installed in a gas supply net in a grid or system. The regulator can be positioned upstream from a gas meter. An initial pressure reading, followed by continuous pressure readings of the regulator, can be taken to ensure that the regulator is functioning properly. At step 320, a gas meter is installed in the gas supply net. The gas meter will be used to count gas volume for billing purposes. In addition, the gas meter can be used to monitor pressure regulator health. The pressure difference between the pressure sensor in the gas meter housing and the pressure in a meter index can enable the gas meter to determine the grid pressure of the regulator. At step 330, the gas meter can determine the initial fingerprint of the regulator. The initial fingerprint indicates several pressure and related flow rate readings over a time period after the gas meter was first installed in the grid to get a regulator specific profile. The initial time period in which the gas meter determines the initial fingerprint depends on how long it takes to get sufficient pressure readings for several flow rates (from a min to a max. flow rate).

In FIG. 3, at step 340, the gas meter compares continuous pressure and flow rate readings of the regulator with the initial fingerprint. The gas meter is continuously determining if the regulator is functioning properly. As such, the gas meter is continuously taking pressure readings of the regulator to make sure that the regulator is functioning properly. The gas meter compares the continuous pressure and flow rate readings with the initial fingerprint to see if the continuous pressure readings match up or correspond, or are within the range of the initial fingerprint. From this comparison, the gas meter can determine whether the regulator is broken or properly functioning.

In FIG. 3, at step 350, the gas meter can notify the head end system if one or more of the continuous pressure readings do not match with the initial fingerprint. The gas meter can determine that the regulator is not functioning properly, and/or that the regulator is damaged. A communication module within the meter index of the gas meter can send an alarm to notify the head end system. In receipt of the alarm from the communication module, the head end system can then provide assistance to have the regulator replaced or repaired. The gas meter or the head system can decide if the integrated valve needs to be closed.

Those skilled in the art will appreciate that the example embodiments are non-exhaustive and that embodiments other than that described here may be included without departing from the scope and spirit of the presently disclosed embodiments.

Advantages

It is understood that the specific order or hierarchy of steps, operations, or instructions in the processes or methods disclosed is an illustration of exemplary approaches. For example, the various steps, operations or instructions discussed herein can be performed in a different order. It is understood that the specific order or hierarchy of steps, operation or instructions in the processes or methods discussed and illustrated herein may be rearranged. The accompanying claims, for example, present elements of the various steps, operations or instructions in a sample order, are not meant to be limited to the specific order or hierarchy presented.

The disclosed embodiments can offer technical improvements to diagnosing the regulator health of each regulator in a system in which the regulators are located in the system with houses and gas meters. The gas meters can determine an initial pressure profile measurement of the regulator after first being installed in a system, wherein each house is configured near a gas meter and a regulator. The regulator need not be able to determine its current health or whether it is functioning correctly. In addition, the regulator need not be able to communicate to the head end of the system to alert that the head end system that the regulator is not functioning properly.

Further, the gas meter can track the continuous pressure measurements of the regulator to determine if those continuous pressure and flow rate measurements are within the range of the initial fingerprint. The gas meter can also alert the head end when one or more of the continuous pressure measurements do not correspond to the initial fingerprint. The gas meter or the head end system can also decide to shut off an integrated valve. Further, the head end can then determine what assistance should be provided to the regulator.

Accordingly, the present invention seamlessly and efficiently operates a system in which a gas meter can determine an initial pressure profile measurement of a regulator, and determine whether the regulator is functioning properly at a later time based on a comparison of continuous pressure measurements to the initial pressure measurement. In addition, the gas meter can inform a head end system when the regulator may be broken and not working correctly.

CONCLUSION

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. The particular implementation of the cylinder system provided thereof may vary depending upon the particular context or application. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

What is claimed is:

1. A method comprising:
   installing a regulator in a gas supply grid;
   installing a gas meter in the gas supply grid, wherein the gas meter diagnoses a grid pressure of the regulator;
   identifying, by the gas meter, an initial fingerprint of the regulator, wherein the initial fingerprint indicates an initial pressure profile over a time period after the gas meter was first installed;
   comparing, by the gas meter, continuous pressure and related flow rate readings of the regulator with the initial fingerprint, wherein the gas meter determines if one or more of the continuous pressure readings correspond to the initial fingerprint; and
   notifying, by the gas meter, a head end system of the one or more continuous pressure readings.

2. The method of claim 1, wherein the gas meter notifies the head end system when the one or more continuous pressure readings do not correspond to the initial fingerprint.

3. The method of claim 1, wherein the grid pressure is determined by calculating a pressure difference between a pressure sensor in the gas meter and another pressure sensor in an electronic index.

4. The method of claim 1, wherein the initial fingerprint is an initial pressure over a flow rate pattern of the regulator.

5. The method of claim 1, further comprising:
   configuring a communication module within a meter index to send an alarm to the head end system.

6. The method of claim 1, wherein the gas meter takes a plurality of pressure readings for several flow rates and seasonal adaptations to identify the initial fingerprint.

7. The method of claim 1, wherein the head end sends for assistance in response to receiving an alarm from a communication module within the gas meter.

8. A system comprising:
   a regulator installed in gas supply grid;
   a gas meter installed in a gas supply grid, wherein the gas meter is configured to take an initial fingerprint of the pressure profile of the regulator, and wherein the gas meter is configured to take continuous pressure readings of the regulator to determine if the regulator is functioning properly; and
   a head end configured to receive an alarm from the gas meter, wherein the gas meter sends the alarm to the head end to indicate that the regulator is not functioning properly.

9. The system of claim 8, wherein the gas meter takes the initial fingerprint from grid pressure in relation to the flow rate over an initial period of time after the gas meter is installed.

10. The system of claim 8, further comprising:
    a first pressure sensor configured within the gas meter; and
    a second pressure sensor configured within a meter index.

11. The system of claim 8, wherein the gas meter is configured to track how the regulator behaves in cases of different pressure and flows.

12. The system of claim 8, wherein the gas meter is configured to track how the regulator behaves when downstream devices are closed.

13. The system of claim 8, wherein the gas meter will determine if the continuous pressure readings are within a range of the initial fingerprint.

14. The system of claim 8, wherein the gas meter is configured to determine if an integrated valve needs to be closed when the continuous pressure readings do not match the initial fingerprint.

15. A system comprising:
    a regulator configured at an upstream position in a grid;
    a gas meter configured within the grid, and configured to take an initial pressure measurement in relation to a flow rate profile of the regulator;
    a pressure sensor configured within the gas meter to enable the gas meter to measure a closing pressure of the regulator, wherein the closing pressure of the regulator is used to determine one point of the initial fingerprint of the regulator; and a head end configured to be informed by the gas meter whether later pressure measurements of the regulator do not correspond with the initial fingerprint of the regulator.

16. The system of claim 15, wherein the gas meter is configured to determine one or more abnormal situations with the regulator.

17. The system of claim 16, wherein the gas meter determines if one or more abnormal situations are occurring with the regulator by determining that the later pressure measurements do not correspond with the initial fingerprint of the regulator.

18. The system of claim 15, wherein the gas meter performs continuous pressure and flow measurements of the regulator to determine if the regulator is functioning properly.

19. The system of claim 15, wherein the gas meter is configured with a pressure pattern learning process in response to being installed in the grid.

20. The system of claim 15, wherein the gas meter is configured to determine whether the regulator is damaged based on continuous pressure and flow measurements not corresponding to the initial fingerprint.

* * * * *